Patented Mar. 8, 1949

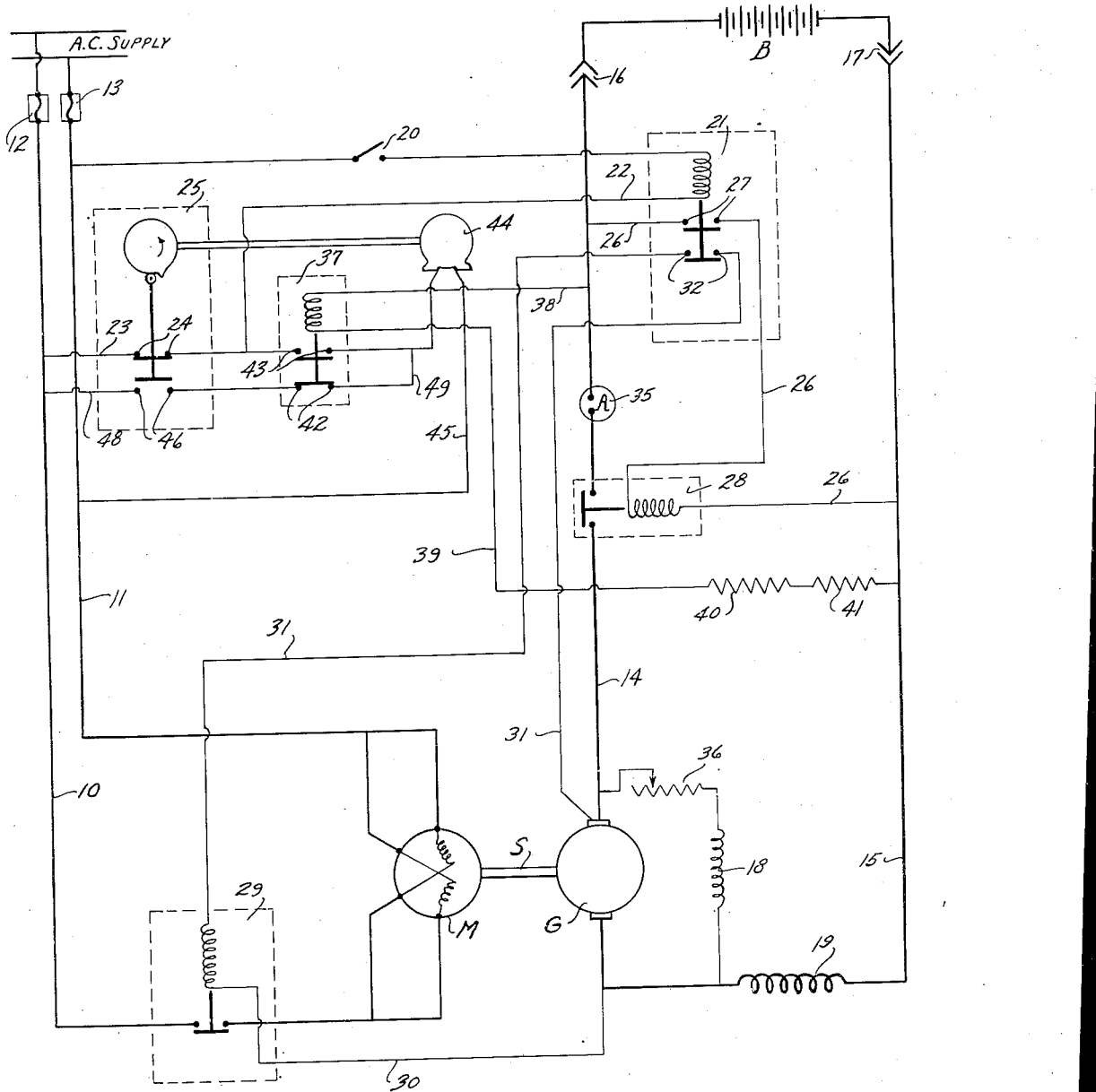

2,463,702

UNITED STATES PATENT OFFICE 2,463,702

BATTERY CHARGER

William H. Lee, Chagrin Falls, and Erasmus D. Smith, Shaker Heights, Ohio, assignors to The Electric Products Company, Cleveland, Ohio, a corporation of Ohio Application October 29, 1945, Serial No. 625,370

9 Claims. (Cl. 320—37)

This invention relates to battery chargers and more particularly to battery chargers of the motor generator type especially adapted for charging the storage batteries of industrial trucks.

A general object of the invention is the provision of a simple, sturdy and efficient storage battery charger which is completely automatic in operation. Another object is the provision of a battery charger in which the operator has only to connect the battery to the charger and see that a single switch is closed, whereupon the charger will automatically function to charge the battery at predetermined rates, automatically cut itself off when the battery has been charged and automatically reset itself for another charging operation when the charged battery is disconnected from the charger. Another object is the provision of a charger in which the circuit is made up of well known reliable components. Further objects and advantages of the invention will become apparent from the following description of a preferred form thereof. The essential characteristics are summarized in the claims.

Briefly, our invention comprises a charger embodying a motor generator set which is automatically started when the charger is connected to the storage battery, preferably by operating the generator as a motor to start the alternating current motor. Thereafter, the charging operation continues at the recommended rate as determined by the generator until the counter voltage of the battery reaches a predetermined value, which varies inversely with the temperature at which the equipment is being operated, and then the charging operation is continued for a predetermined length of time, after which the charging circuit is opened and the motor generator stopped. Thereafter, the battery may be disconnected from the charger, whereupon the apparatus automatically resets itself for the next charging operation.

This sequence of operations is carried out by means of the preferred form of apparatus shown diagrammatically in the single figure of the drawing. As there illustrated, the motor M, which in the embodiment shown is a single phase wound rotor induction motor, is directly connected to the generator G, the rotor of the motor and the armature of the generator preferably being mounted on the same shaft S in accordance with usual practice. The heavy lines 10 and 11 indicate the main power supply lines for the motor which are provided with fuses 12 and 13 and which may be connected to any convenient source of alternating current. The heavy lines 14 and 15 represent the battery charging circuits leading from the generator G, the field coils of which are indicated at 18 and 19, to suitable plug connectors indicated at 16 and 17 through which the charger may be connected to the storage battery B. The connectors are preferably arranged in accordance with the usual practice so that it is impossible to make the connection with the wrong polarity.

The circuits are such that in order to charge a battery, the operator needs only to see that the motor control switch 20 is closed and then connect the battery to the conductors 14 and 15 by means of the plugs 16 and 17. Upon closing the motor control switch 20, the auxiliary contact relay 21 closes its contacts, this relay being energized from the alternating current supply lines 10 and 11 through the conductors 22 and 23, the circuits including the closed contacts 24 of the time delay switch 25. When the battery is plugged in, current supplied by the battery flows through conductors 26 and contacts 27 of the relay 21, energizing the battery line contactor 28 and closing the circuit between the generator and the battery. At this stage of the operation, the motor M is not energized, the motor line contactor 29 being open, and the closing of the circuit between the generator and the battery B causes the generator to operate as a motor, driving the motor M. When the generator operates at a speed such that the generator armature voltage reaches about half of the rated charging voltage at which time the armature is rotating at a speed greater than one-half of its rated speed, the motor line contactor 29 closes, this contactor being connected across the generator armature through conductors 30 and 31, the circuit including the contacts 32 of the auxiliary contact relay 21, which, as noted above, is energized when the motor control switch 20 is closed.

Thus the generator is used to bring the motor up to a speed such that it will operate at rated speed when the connection to the A. C. line is completed. Preferably, the connection is made only after the motor has reached a speed greater than half the rated speed. This prevents any possibility of the motor operating at sub-synchronous speeds, and insures that the motor and generator will not be subjected to unusually heavy currents while starting. This arrangement eliminates the need for auxiliary starting windings, or the like, in the motor and provides a simple and substantially fool-proof construction.

After the motor line contactor 29 closes, the motor accelerates to its normal speed and the generator acts as a generator, the flow of current in the lines 14 and 15 being reversed as compared to the direction of flow when the battery was driving the generator. This is indicated by the ammeter 35 which shows the battery as discharging as long as the generator is driving the motor, and which indicates the rate of charge of the battery when the motor is driving the generator in the normal manner.

The charging operation will continue at a rate determined by the characteristics of the generator and adjustable by the resistance 36 in series with the generator shunt field 18, until the battery counter voltage reaches a predetermined value; for example, in the case of a six cell lead acid battery, this may be 14.2 volts at a room temperature of 77° F. When the voltage reaches the predetermined value, the battery voltage relay 37 closes, this relay being connected across the battery charging circuits 14, 15 through conductors 38 and 39, the circuit including resistors 40 and 41 which are composed of carbon or some other material having a negative thermal coefficient of resistance. Thus the presence of these resistors in the battery voltage relay circuit automatically compensates for changes in temperature without requiring any complicated or delicate apparatus, the relay closing at lower battery voltages as the temperature is raised and at higher battery voltages as the temperature is lowered, the values of the resistors and the operating voltage of the relay being correlated to give the desired operation under varying temperature conditions.

Operation of the battery voltage relay 37 opens the circuit through contacts 42 and closes the circuit through contacts 43. The closing of this last circuit results in the supply of current from the main A. C. power lines to the time delay motor 44 through the conductor 23, the closed contacts 24 of the time delay switch 25, the contacts 43 of the battery voltage relay and the conductor 45 leading to the main A. C. line 11. The motor, which may be a self-starting synchronous motor of the type ordinarily used in synchronous electric clocks, controls the time delay switch 25, the motor being connected so as to trip the switch after a predetermined interval, for example, about three hours in a typical charger.

Tripping of the time delay switch 25 opens the circuit which includes conductor 23 and contacts 24, while the circuit through the contacts 46 of the switch is closed. Tripping the time delay switch thus opens the circuit to the auxiliary contact relay 21 which drops out, opening the circuits to the battery line contactor 28 and the motor line contactor 29; these contactors open and disconnect the generator from the battery and the motor from the A. C. power supply. The charging operation is completed and the battery may be disconnected from the lines 14 and 15 at any time without danger of arcing when the plugs 16 and 17 are pulled out.

When the battery is disconnected from the lines 14 and 15 the battery voltage relay 37 is deenergized, opening the circuit through the contacts 43 and closing the circuit through the contacts 42. Thereupon the time delay motor is energized through the circuit which includes the conductor 48, the contacts 46 of the time delay switch 25, the contacts 42 of the battery voltage relay, the conductor 49 and the conductor 45. The control for the time delay switch is such that upon operation of the time delay motor for a short period of time, for example about two minutes, the time delay switch 25 is reset to its original position as shown in the drawing with the circuit through contacts 24 closed and the circuits through contacts 46 open, stopping the time delay motor and placing the entire apparatus in the condition it was before the charging cycle was initiated. The charger is thus ready to charge another battery.

Interruptions in the alternating current supply do no more than temporarily interrupt the operation of the charger, the circuit being such that charging is resumed where it left off upon restoration of the power supply without requiring any attention or adjustments. For example, if the power should fail during the first part of the charging cycle, i. e., before the operation of the battery voltage relay 37, then the failure of the alternating current supply would result in opening the auxiliary contact relay 21 which in turn will open the battery line contactor 28 and the motor line contactor 29. Thus the battery circuit is open except for the connection to the battery voltage relay 37, and inasmuch as the total resistance of the relay 37 and the resistances 40 and 41 is substantial, the battery will not be discharged to any substantial extent during the power interruption. When the power is restored, the generator will start driving the motor as before, and the charging operation will be resumed with the apparatus going through the various stages previously described.

If the power should fail after the battery voltage relay has operated, then the auxiliary contact relay 21 will drop out, opening the battery line contactor 28 and the motor line contactor 29 as before. Also, the time delay motor 44 will stop. When power is restored, the motor generator set will start in the manner previously described and the time delay motor will start and operate to trip the time delay switch at the end of the same total time for the second part of the charging cycle regardless of the duration of the power interruption.

When it is desired to give a battery an equalizing charge, it is only necessary to charge the battery in the usual manner, then when the charger has automatically shut down at the conclusion of the charging cycle, to disconnect the battery plugs and immediately reconnect them. Inasmuch as the battery voltage is then above the voltage at which the battery voltage relay operates, the relay will trip immediately upon the resumption of charging by the generator, the time delay motor will start and the charging operation will be continued for the standard period of time for which the time delay switch is set.

From the foregoing description of a preferred form of our invention, it will be evident that we have provided a simple and sturdy charger which is automatic and fool proof in operation. No skill is required on the part of the operator as it is only necessary to plug the charger into the battery to initiate its operation. The charging cycle is controlled automatically to charge the battery in accordance with a predetermined schedule. If the power supply should fail, the charger, upon restoration of the power supply, will automatically resume charging from the point in the cycle at which it stopped. The arrangement is such that an equalizing charge can be given by merely disconnecting and reconnecting a charged battery. All of these advantageous operating results are obtained with a simple circuit requiring no delicate or special components. The construction of the motor is simplified by the arrangement whereby the generator starts the motor.

Those skilled in the art will appreciate that various changes and modifications may be made in our invention without departing from the spirit and scope thereof. Therefore, it is to be understood that our patent is not limited to the preferred form of the invention described herein or in any manner other than by the scope of the appended claims.

We claim:

1. In a battery charger having a motor-generator, a power supply circuit for supplying power to the motor and a battery charging circuit for connecting the generator with a battery to be charged; the combination of a battery line contactor for controlling said battery charging circuit, a motor line contactor for controlling said power supply circuit, a control circuit including an auxiliary contact relay adapted to be energized from the power supply circuit and controlling circuits leading to said battery line contactor and said motor line contactor, said battery line contactor being closed when said auxiliary contact relay is energized and the battery charging circuit connected to a battery, said motor line contactor being closed when said auxiliary contact relay is energized and the generator armature voltage exceeds a predetermined value, a time delay switch, and a battery voltage relay having a resistance with a negative temperature coefficient of resistance connected across said battery charging circuit and arranged to initiate operation of said time delay switch when the voltage impressed upon the battery voltage relay reaches a predetermined value, said time delay switch operating to open the circuit leading to the auxiliary contact relay and thereby to open the battery line contactor and the motor line contactor at a predetermined time after the operation of the battery voltage relay, said battery voltage relay and time delay switch being provided with circuits whereby said time delay switch resets itself when the charger is disconnected from a battery after the charging cycle is completed.

2. In a battery charger having a motor-generator, a power supply circuit for supplying power to the motor and a battery charging circuit for connecting the generator with a battery to be charged; the combination of a battery line contactor for controlling said battery charging circuit, a motor line contactor for controlling said power supply circuit, a control circuit including an auxiliary contact relay adapted to be energized from the power supply circuit and controlling circuits leading to said battery line contactor and said motor line contactor, said battery line contactor being closed when said auxiliary contact relay is energized and the battery charging circuit connected to a battery, said motor line contactor being closed when said auxiliary contact relay is energized and the generator armature voltage exceeds a predetermined value, a time delay switch, and a battery voltage relay having a resistance with a negative temperature coefficient of resistance connected across said battery charging circuit and arranged to initiate operation of said time delay switch when the voltage impressed upon the battery voltage relay reaches a predetermined value, said time delay switch operating to open the circuit leading to the auxiliary contact relay and thereby to open the battery line contactor and the motor line contactor at a predetermined time after the operation of the battery voltage relay.

3. In a battery charger having a motor-generator, a power supply circuit for supplying power to the motor and a battery charging circuit for connecting the generator with a battery to be charged; the combination of a battery line contactor for controlling said battery charging circuit, a motor line contactor for controlling said power supply circuit, a control circuit including an auxiliary contact relay adapted to be energized from the power supply circuit and controlling circuits leading to said battery line contactor and said motor line contactor, said battery line contactor being closed when said auxiliary contact relay is energized and the battery charging circuit connected to a battery, said motor line contactor being closed when said auxiliary contact relay is energized and the generator armature voltage exceeds a predetermined value, a time delay switch, and a battery voltage relay connected across said battery charging circuit and arranged to initiate operation of said time delay switch when the voltage impressed thereon reaches a predetermined value, the time delay switch operating to open the circuit leading to the auxiliary contact relay and thereby to open the battery line contactor and the motor line contactor at a predetermined time after the operation of the battery voltage relay.

4. In a battery charger having a motor-generator, a power supply circuit for supplying power to the motor and a battery charging circuit for connecting the generator with a battery to be charged; the combination of a battery line contactor for controlling said battery charging circuit, a motor line contactor for controlling said power supply circuit, and a control circuit including an auxiliary contact relay adapted to be energized from the power supply circuit and controlling circuits leading to said battery line contactor and said motor line contactor, said battery line contactor being closed when said auxiliary contact relay is energized and the battery charging circuit connected to a battery, said motor line contactor being closed when said auxiliary contact relay is energized and the generator armature voltage exceeds a predetermined value.

5. In a battery charger having a motor-generator, a power supply circuit for supplying power to the motor and a battery charging circuit for connecting the generator with a battery to be charged; the combination of a time delay switch, a battery voltage relay arranged to initiate operation of said time delay switch when the counter voltage of the battery being charged reaches a predetermined value, the time delay switch operating to open the battery charging circuit at a predetermined time after the operation of the battery voltage relay, the battery voltage relay and time delay switch being provided with circuits whereby the time delay switch resets itself when the charger is disconnected from a battery after the charging cycle is completed.

6. In a battery charger having a motor-generator, a power supply circuit for supplying power to the motor and battery charging circuit for connecting the generator with a battery to be charged; the combination of a time delay switch, a battery voltage relay arranged to initiate operation of said time delay switch when the voltage applied thereto reaches a predetermined value, said battery voltage relay being connected in series with a carbon resistance across said battery charging circuit, the time delay switch operating to open the battery charging circuit at a predetermined time after the operation of the battery voltage relay and time delay switch being provided with circuits whereby the time delay switch resets itself when the charger is disconnected from a battery after the charging cycle is completed.

7. In a battery charger having a motor-generator, a power supply circuit for supplying power to the motor and a battery charging circuit for connecting the generator with a battery to be charged; the combination of a battery line contactor for controlling said battery charging circuit, a control circuit including an auxiliary contact relay adapted to be energized from the power supply circuit and controlling circuits leading to said battery line contactor, said battery line contactor being closed when said auxiliary contact relay is energized and the battery charging circuit connected to a battery, a time delay switch, and a battery voltage relay connected across said battery charging circuit and arranged to initiate operation of said time delay switch when the voltage impressed thereon reaches a predetermined value, the time delay switch operating to open the circuit leading to the auxiliary contact relay and thereby to open the battery line contactor at a predetermined time after the operation of the battery voltage relay.

8. In a battery charger having a motor-generator, a power supply circuit for supplying power to the motor and a battery charging circuit for connecting said generator with a battery to be charged; the combination of a battery line contactor for controlling said battery charging circuit, a control circuit including an auxiliary contact relay adapted to be energized from the power supply circuit and controlling a circuit leading to the battery line contactor, said battery line contactor being closed when said auxiliary contact relay is energized and the battery charging circuit connected to a battery, a time delay switch operable to open the circuit leading to the auxiliary contact relay and thereby to open the battery line contactor a predetermined time after the counter voltage of the battery reaches a predetermined value.

9. In a battery charger having a motor-generator, a power supply circuit for supplying power to the motor and a battery charging circuit for connecting the generator with a battery to be charged; the combination of a time delay switch, a relay arranged to initiate operation of said time delay switch, the time delay switch operating to open the battery charging circuit at a predetermined time after the operation of the relay, the relay and time delay switch being provided with circuits whereby the time delay switch resets itself when the charger is disconnected from a battery after the charging cycle is completed.

WILLIAM H. LEE.
ERASMUS D. SMITH.

REFERENCES CITED

The following references are of record in the file of this patent:

UNITED STATES PATENTS

| Number | Name | Date |
|---|---|---|
| 969,542 | Krotz | Sept. 6, 1910 |
| 1,122,287 | Lincoln | Dec. 29, 1914 |
| 1,208,044 | Suren | Dec. 12, 1916 |
| 1,222,257 | Auth | Apr. 10, 1917 |
| 1,260,218 | Lincoln | Mar. 19, 1918 |
| 1,373,621 | Lincoln | Apr. 5, 1921 |
| 1,468,024 | Jullin | Sept. 18, 1923 |
| 1,480,326 | Wilms | Jan. 8, 1924 |
| 1,538,588 | Pohler | May 19, 1925 |
| 1,659,045 | Nelson | Feb. 14, 1928 |
| 1,677,644 | Lomax | July 17, 1928 |
| 1,710,542 | Landis | Apr. 23, 1929 |
| 1,726,639 | Addicks | Sept. 3, 1929 |
| 1,905,238 | Marthens | Apr. 25, 1933 |
| 1,970,939 | Langabeer et al. | Aug. 21, 1934 |
| 2,197,423 | Agnew | Apr. 16, 1940 |
| 2,366,992 | Willing et al. | Jan. 9, 1945 |

FOREIGN PATENTS

| Number | Country | Date |
|---|---|---|
| 617,079 | Germany | Aug. 12, 1935 |
| 56,002 | Sweden | Feb. 12, 1924 |